March 11, 1969
M. L. ROBINSON
3,432,746
APPARATUS FOR MEASUREMENT OF FLUID CONDUCTIVITY USING
D.C. POWER IN A CONDUCTIVITY CELL
Filed Jan. 18, 1965
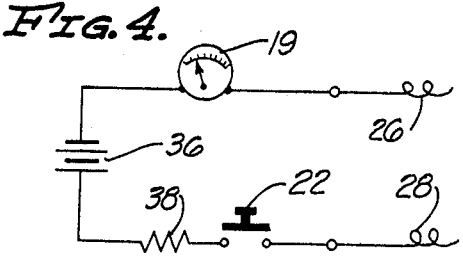
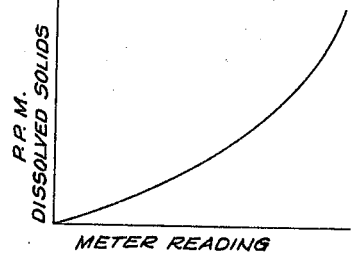
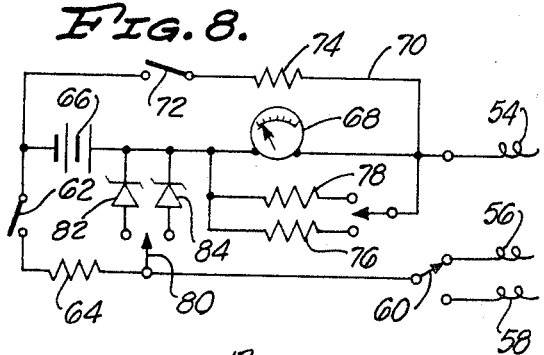
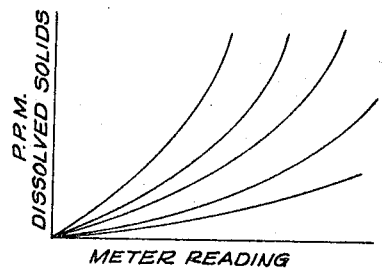
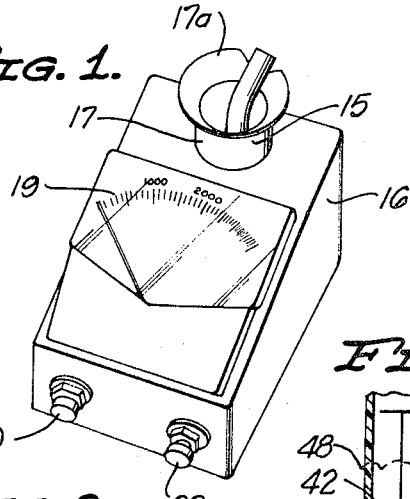
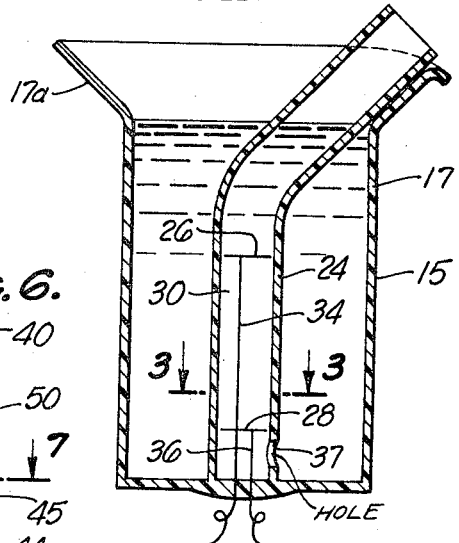
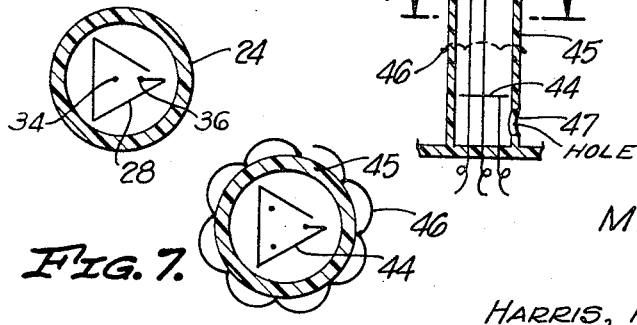
INVENTOR.
MYRON L. ROBINSON
BY HIS ATTORNEYS
HARRIS, KIECH, RUSSELL & KERN

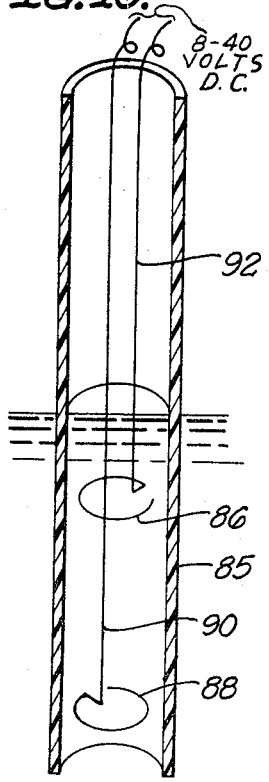
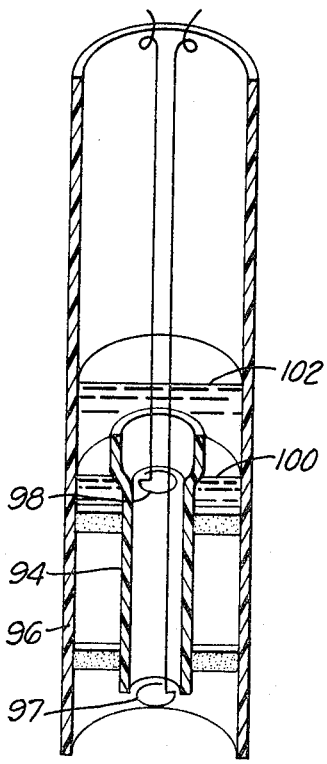
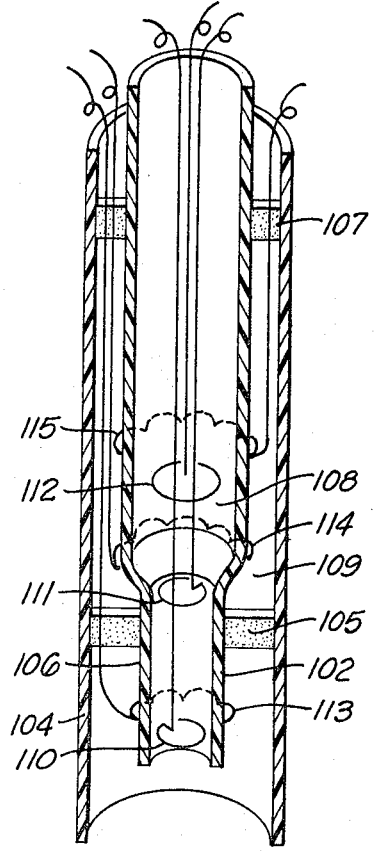
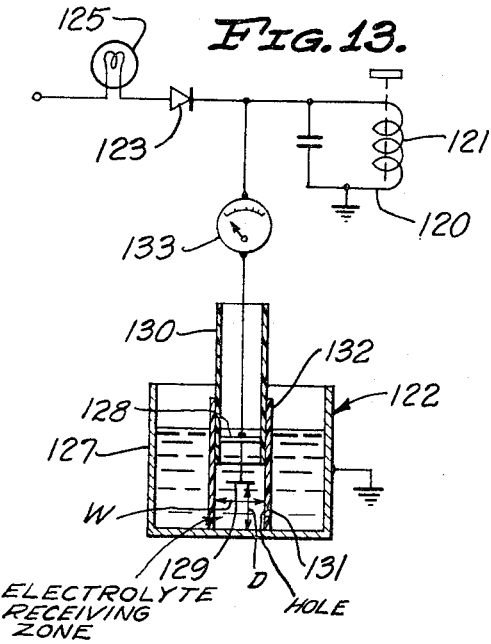

United States Patent Office 3,432,746
Patented Mar. 11, 1969

3,432,746
APPARATUS FOR MEASUREMENT OF FLUID CONDUCTIVITY USING D.C. POWER IN A CONDUCTIVITY CELL
Myron L. Robinson, San Gabriel, Calif.
(419 De La Fuente St., Monterey Park, Calif. 91754)
Filed Jan. 18, 1965, Ser. No. 426,036
U.S. Cl. 324—30               6 Claims
Int. Cl. G01r *11/44;* G01v *9/00, 9/02*

ABSTRACT OF THE DISCLOSURE

Apparatus for measurement of fluid conductivity comprising electrodes disposed within an insulating tubular shield defining an elongated electrolyte receiving zone, with the distance between the electrodes being greater than the width of the zone, and with a D.C. electric power source in the range of 8 to 40 volts applied across the electrodes, providing an instrument for measuring dissolved solids in parts per million and requiring no zero adjustment or calibration during operation.

---

This invention relates to an apparatus for the measurement of the conductivity of a liquid, and more particularly to an apparatus of simplified structure requiring no zero adjustment or calibration, and giving an instantaneous readout with no warm-up time.

In the measurement of electrical conductivity of liquids, it is conventional practice in one commonly used instrument to apply an alternating current potential across a Wheatstone bridge arrangement in which one arm of the bridge comprises a sample of the liquid being measured, with spaced plate electrodes located therein. A null detector is provided to balance the Wheatstone bridge by the familiar impedance bridge method. From the measured resistance or conductance and the geometric constants of the cell, the conductivity of the liquid may be computed. An adjustable resistor of the Wheatstone bridge may be marked to read directly in conductance providing various adjustments are made to compensate for variations in cells and temperature effect.

Among the principal disadvantages of the Wheatstone bridge arrangement is the necessity of manually zeroing and balancing of the bridge in order to obtain a reading. Additionally, the cell requires periodic calibration.

It is an object of the invention to provide a conductance measuring apparatus in which the conductance of the liquid sample is readily determined in which a true zero is obtained without adjustment.

It is a further object of the invention to provide a conductance measuring apparatus which has an extremely wide range of measurement on a single cell.

It is a further object of the invention to provide a conductance measuring device employing a simple electrical circuit having a minimum number of components, yet providing reliable operation and results.

It is another object of the invention to provide a conductance measuring device requiring no warm-up time and providing an instantaneous readout.

It is a still further object of the invention to provide a conductance measuring device requiring no calibration nor zero adjustment or checking with standard solutions.

It is another object of the invention to provide a conductance measuring device which is simple to use and a device not employing calibration charts.

The invention also includes novel details of constructions and novel combinations which will more fully appear in the following description and drawings wherein:

FIG. 1 is an isometric view of a preferred portable embodiment of the dissolved solid or conductance measuring meter of the invention;

FIG. 2 is a longitudinal sectional view taken through the electrolytic cell portion of the device of FIG. 1;

FIG. 3 is a cross-sectional view taken along line 3—3 of FIG. 2;

FIG. 4 is a schematic diagram of the conductance measuring circuit of the device of FIG. 1;

FIG. 5 is a diagrammatic representation of the non-linearity of the meter reading achieved by the incorporation of a resistor in the conductance measuring circuit of FIG. 4;

FIG. 6 is a fragmentary longitudinal sectional view of an alternative embodiment of an electrolytic cell of the invention;

FIG. 7 is a cross-sectional view taken along line 7—7 of FIG. 6;

FIG. 8 is a schematic representation of another embodiment of the conductance measuring circuit of the invention employing features that provide for a variety of ranges of responses;

FIG. 9 is a diagrammatic representation of several responses or ranges of meter readings that are characteristic of the conductance measuring circuit of FIG. 8;

FIG. 10 is a longitudinal sectional view of a probe type embodiment of the device of the invention;

FIG. 11 is a longitudinal sectional view of still another type of the probe embodiment of the device of the invention;

FIG. 12 is a longitudinal sectional view of a third embodiment of the probe type device of the invention; and FIG. 13 is a schematic representation of an automatic version embodiment of the device of the invention.

Referring to FIGS. 1–3, there is illustrated a simplified version of the dissolved solid meter or conductance measuring device of the invention employing an electrolytic cell 15 which is vertically supported in a larger housing 16 of the device with the top of the electrolytic cell being open. In FIG. 1, the device is seen to also include a meter readout scale or dial 19, and two push buttons 20 and 22. In the particular embodiment illustrated the dial 19 is calibrated in parts per million of dissolved ionizable solids. Both push buttons 20 and 22 are spring loaded to their off positions and must be pushed inwardly to complete their respective circuits. The push button 20 is a battery test switch. The other button 22 is incorporated in the electrode circuit illustrated in FIG. 4 and described more completely hereinafter.

The electrolytic cell 15 has an outer vessel 17 formed of a dielectric plastic such as polyethylene which has the configuration of a tumbler having an outwardly flared rim 17a. The cell 15 has integrally formed therewith an electrode protective stem or elongated tubular electrode shield 24, the base of which is integrally formed with and located centrally of the bottom of the outer vessel 17. In the particular embodiment illustrated both the electrolytic cell's outer vessel 17 and the tubular electrode shield 24 are circular in cross section with the tubular shield being of a considerably less diameter. Two electrodes 26 and 28 are supported within the tubular shield 24 with the conductive path therebetween being substantially greater than the width of an elongated electrolytic zone 30 defined by the tubular shield 24. Desirably, the conductive path or distance between the two electrodes 26 and 28 is at least four times greater than the width of the electrolytic zone 30, and ordinarily not more than ten times greater. This is in contrast to conventional cells which use closely spaced electrodes with large surface areas and require low operating voltages to prevent gas generation. The large area electrodes also introduce electrode capacitance problems.

The two electrodes 26 and 28 as best seen in FIG. 3 take the form, in the embodiment illustrated, of a triangular loop of wire and are respectively carried by insulated conductive supports (lead wires) 34 and 36 (FIG. 2). There are numerous available conductive materials that may be used for the electrodes including platinum, nickel, silver, iron, copper, aluminum, stainless steel and carbon. Preferably the metal used should be non-corrosive for the device's intended use.

A hole 37 through the wall of the tubular shield 24 adjacent the bottom of the outer vessel 17 provides for liquid communication between the inner electrolytic zone 30 and the vessel 17 thereabout.

The conductive measuring circuit of the electrolytic cell 15 is illustrated in FIG. 4 and is seen to comprise an electric power source or battery 36 which is connected across the electrodes 26 and 28, a resistor 38, and a push button circuit breaker 22 which latter two components are serially connected in the circuit between the battery and one of the electrodes 26 and 28. Preferably the upper electrode 26 within the tubular electrode shield 24 is maintained as the cathode although this is not critical. The sensitivity of the instrument increases with voltage and desirably the voltage across the electrodes is maintained above about 6 volts and preferably within the range of 8 to 40 volts. For high accuracy the voltage is desirably maintained substantially constant. The linearity increases with voltage. In order to increase the range of the readout meter 19 a resistor 38 may be incorporated in the circuit to provide a non-linear response as illustrated in FIG. 5. Deletion of the resistor 38 from the circuit will result in a substantially linear response. In selecting the valve of the resistor for the amount of non-linearity desired, the electrode voltage should not be permitted to go below about 6–7 volts at maximum current in order to have good reproducibility of results. Electrolytic conductance measuring cells heretofore proposed have been operated at relatively low voltagees of 4 volts or less Unlike the usual conductance cells, the areas of the electrodes 26 and 28 are not critical but are desirably held at a relatively small value in order to insure rapid equilibrium of polarization and gas generation at the relatively high voltages used. In conventional conductance cells, the condition as well as the area of the electrodes are critical features in good cell operation. This is not true of the cell of the invention and hence cleanliness is of secondary importance although the gas generation that does occur at the electrode cleanses the electrodes in the normal course of operation.

The preferred electrode takes the form of a wire which has been bent into a loop and which loop is preferably positioned in a horizontal plane to minimize the effect of gas evolution. The length and area of the conductivity path determines sensitivity and it is desirable that the movement of the electrolyte past the electrodes be minimized to avoid disturbing the gas film. It is important that the electrodes be confined to maintain a constant liquid conductivity path therebetween and for this reason the electrodes 26 and 28 are positioned in a narrow elongated electrolytic zone 30 provided by the tubular electrode shield 24. The liquid level or volume maintained in the electrolytic cell 15 is not critical, it only being necessary that the liquid level be above the upper electrode so as to provide a liquid conductivity path between the two electrodes.

The conductance device of the invention is simple to use and requires only filling of the device with the water or liquids to be measured. The reading is available instantaneously upon closing the circuit through depression of the spring loaded button 22. There is no warm-up time required as is characteristic of some conductance cells and there is no checking with standard solutions. The electrolytic cell of the invention has no drift, requires no calibration or zero adjustment, and no gain adjustment is necessary. Since the battery is disconnected from the circuit except when an actual reading is being taken, it is possible with a standard battery to make numerous tests. Desirably, the readout dial 19 is calibrated in parts per million of dissolved solids. The range of the instrument illustrated is from 0–5000 p.p.m. with the dial being provided with 100 p.p.m. divisions. It is possible to provide a device with other ranges or with a plurality of ranges as illustrated in the probe type cells of FIGS. 11 and 12. The device of the invention is compact and portable and may be built to provide a device of palm size.

A modified version of the device of FIGS. 1–3 is illustrated in FIGS. 6 and 7 which device has three, vertically spaced electrodes 40, 42, and 44 spaced within a tubular electrode shield 45 with two, vertically spaced electrodes 46 and 48 placed immediately adjacent and exteriorly of the shield. The tubular electrode shield 45 has a liquid communication passageway 47 adjacent the base thereof. The electrolytic cell of FIGS. 6 and 7 is provided with means for selecting two of the electrodes as the anode and cathode and it will be seen that the distance between any two electrodes is greater than the width of the electrolytic zone 50 enclosed by the tubular electrode shield 45. By selecting various combinations of the electrodes several ranges of response may be had.

The conductance measuring circuit illustrated in FIG. 8 provides a number of response ranges dependent upon the different combinations of voltage, meter sensitivity and selection of electrodes. Referring to FIG. 8 it will be seen that the device is provided with three electrodes 54, 56, and 58. By movement of the electrode selector 60, either one of the two electrodes 56 and 58 may be employed in combination with the electrode 54. The basic circuit of the device includes, as before, a spring loaded circuit switch 62 serially connected with a resistor 64, battery 66, and meter 68 between electrode 54 and one of the two electrodes 56, 58. A battery test circuit made up of a battery test switch 72 and resistor 74 permit the testing of the strength of the battery. The range of response of the device may be changed by placing either one of the two meter shunts 76 and 78 in parallel with the meter 68. The range of response may also be altered by moving switch 80 in contact with one or the other of the Zener diode shunts 82 and 84. Zener diodes are well known voltage regulators and give a substantially constant voltage. Some of the available response ranges that may be had with the device of FIG. 8 are illustrated in FIG. 9. It is possible to obtain a 0–5 p.p.m. range and a 0–50,000 p.p.m. range with a single pair of electrodes merely by selection of the appropriate shunt resistor.

Three probe type versions of the conductance device of the invention are illustrated schematically in FIGS. 10, 11, and 12. It will be seen that these devices, unlike that illustrated in FIGS. 1–3, have no outer vessel 17 but employ simply an elongated, insulated tubular electrode shield which may be immersed manually into the liquid whose conductance is being checked. The device of FIG. 10 is the simplest of the three designs and comprises an elongated tubular electrode shield 85 made of a dielectric material and which contains therein two spaced electrodes 86 and 88 supported at the lower ends of insulated electrode leads 90 and 92. The device illustrated in FIG. 10 may be employed with the circuitry of FIG. 4.

The device of FIG. 11 has inner and outer tubular shields 94 and 96. Two spaced electrodes 97 and 98 are located within the innermost tubular shield 94 with electrode 97 being adjacent the bottom of the shield and the other electrode 98 near the top. It will be noted that the inner tubular electrode shield 94 is considerably shorter than the outer shield 96 and is positioned near the bottom of the outer shield. This is an important feature of the device of FIG. 11 and makes possible two ranges of response even though the device employs only two electrodes. The first range of response is had by immersing the probe to bring the liquid to level 100 which level is below the top of the inner tubular electrode shield 94.

With this positioning of the probe device of FIG. 11 there is a single conductive path within the electrolytic zone defined by the inner tubular electrode shield 94. The other range of response is had by submerging the probe to water level 102 which results in the complete submergence of the inner tubular electrode 94 and thus provides two conductance paths between the electrodes 97 and 98. One of the electrode paths is within the inner tubular shield 94 and the other in the annular space between the two shields.

The device of FIG. 12 is another version of the probe type instrument and comprises two coaxially disposed tubular electrode shields 102 an 104 with the inner shield 102 being held by webs 105 and 107 to the outer tubular shield 104. The inner tubular electrode shield 102 has a neckdown portion 106 at its lower end of smaller diameter than the rest of the member. The inner tubular electrode shield 102 defines an elongated electrolytic zone 108 within its confines and between the two electrode shields 104 and 106 there is a second elongated annularly shaped electrolytic zone 109. There are three vertically spaced electrodes 110, 111, and 112 located within the inner electrolytic zone 108 with two of the electrodes 110 and 112 being located within the neckdown portion 106. Three electrodes 113, 114, and 115 are vertically spaced within the elongated annular outer electrolytic zone 109. All the electrodes comprise horizontally disposed wire loops which are respectively held at the lower ends of insulated wire leads. The probe type design of FIG. 12 provides a number of response ranges with a different range of response for each combination of electrodes. Means are provided for selecting any two of the electrodes as the anode and cathode of the electrolytic cell. Again, it will be noted that the distance between any of the two electrodes of the version illustrated in FIG. 12 is greater than the width of the inner electrolytic zone 107.

The schematic of FIG. 13 illustrates a line powered conductance cell provided with an automatic control in the form of a relay 120 for controlling a pump, valve, or the like. The relay comprises a solenoid 121 which is placed in parallel with a conductance cell 122. A current rectifier 123 is located between the power line and the conductance cell 122 and relay 121. A signal lamp 125 is located between the power line and the rectifier 123. An outer vessel 127 comprises one of the electrodes of the cell with the other electrode 129 being fixed to a support 128 in a movable member 130 made of dielectric material. The movable member 130 is movably held within an outer tubular electrode shield 132 also made of dielectric material. The tubular electrode shield 132 has a hole 131 adjacent its base permitting liquid passage therethrough. The distance between the two electrodes 127 and 129 is regulated by movement of the member 130 within the outer electrode shield 132. It will be appreciated that with this arrangement numerous response ranges are available. The control relay 120 is set to react to certain electrical conditions and will actuate the pump, valve, or other component regulated thereby when those conditions exist. A meter 133 may, if desired, be located in the electrolytic cell feed line between the cell and the rectifier 123.

In FIGURE 13, the zone between the electrode 129 and the electrode 127 within the shield 132 is identified as the electrolyte receiving zone, having a distance D between the electrodes and a width W, with D being greater than W.

The temperature effect on the accuracy of the conductance measuring device of the invention is about 1% per 1° F. in range of 85° F. ± 20° F. The temperature effect can be compensated for by incorporation of a thermistor in the device. The pH effect is low between 4 and 11. If desired, benzoic acid may be employed for pH adjustment.

I claim:

1. An apparatus for measuring the conductance of a liquid, the improvement comprising:
   spaced apart first and second electrodes;
   an elongated tubular shield formed of insulating material about said two electrodes, said shield defining an elongated electrolyte receiving zone with the distance between the electrodes being greater than the width of said zone;
   a D.C. electric power source; and
   circuit means for connecting said power source across said electrodes to supply a D.C. voltage in the range of 8 to 40 volts across the electrodes.

2. In an apparatus for measuring the conductance of a liquid, the improvement comprising:
   a cell for holding the liquid to be measured, said cell having two vertically spaced electrodes;
   an elongated, vertically disposed tubular shield mounted in said cell and formed of insulating material about said vertically spaced electrodes, said shield defining an elongated electrolyte receiving zone with the distance between the electrodes being greater than the width of said zone and said tubular shield having a passageway providing liquid communication between the zone defined by said tubular shield and the cell thereabout;
   a D.C. electric power source; and
   circuit means for connecting said power source across said electrodes to supply a D.C. voltage in the range of 8 to 40 volts across the electrodes.

3. In an apparatus for measuring the conductivity of a liquid, the improvement comprising:
   at least three vertically spaced electrodes;
   an elongated, vertically disposed tubular shield formed of insulating material about said electrodes, said shield defining an elongated electrolyte receiving zone with the distance between any two electrodes being greater than the width of said zone;
   means for selecting two of said electrodes as the anode and cathode; and
   a D.C. electric power source connected across the selected cathode and anode supplying a voltage in the range of 8 to 40 volts thereacross.

4. In an apparatus for measuring the conductance of a liquid, the improvement comprising:
   a cell for holding the liquid to be measured, said cell having at least three vertically spaced electrodes;
   an elongated vertically disposed tubular shield mounted in said cell and formed of insulating material about said electrodes, said shield defining an elongated electrolyte receiving zone with the distance between any two of said electrodes being greater than the width of said zone and said tubular shield having a passageway providing liquid communication between the zone defined by said tubular shield and the cell thereabout;
   means for selecting two of said electrodes as the anode and cathode of said cell; and
   a D.C. electric power source connected across said selected anodes and cathode supplying a voltage in the range of 8 to 40 volts thereacross.

5. In an apparatus for measuring the conductance of a liquid, the improvement comprising:
   two coaxially vertically disposed elongated tubular shields formed of insulating material, said shields defining an inner elongated electrolyte receiving zone and an outer elongated annular electrolyte receiving zone and means providing liquid communication between the inner and outer zones;
   a plurality of electrode members located in said two zones;
   means for selecting two of said electrode members as anode and cathode with the conductance path in an electrolyte between any of two of said electrode members being greater than the width of said inner zone; and a D.C. electric power source connected across said anode and cathode supplying a voltage in the range of 8 to 40 volts thereacross.

6. In an apparatus for measuring the conductance of a liquid, the improvement comprising:

two coaxially and vertically disposed elongated tubular shields formed of insulating material with the innermost of said tubular shields defining an elongated, inner electrolyte receiving zone and with the space between said tubular shields defining an annular electrolyte receiving zone and means providing liquid communication between the inner zone and the outer annular zone;

a plurality of electrodes vertically spaced apart and located within the two zones with the electrodes of the outer annular zone taking the form of a ring substantially encircling the inner tubular shield;

means for selecting two of the electrodes as the anode and cathode with the distance between any of the two electrodes being greater than the width of said inner zone;

a D.C. electric power source connected across the anode and cathode supplying a voltage in the range of 8 to 40 volts across said selected two electrodes;

a resistor; and circuit means serially connecting said resistor in circuit intermediate said electric power source and one of the anode and cathode.

References Cited

UNITED STATES PATENTS

| | | | |
|---|---|---|---|
| 993,586 | 5/1911 | Digby et al. | 324—30 |
| 2,122,363 | 6/1938 | Christie | 324—30 |
| 2,254,400 | 9/1941 | Starr | 324—30 |
| 2,871,446 | 1/1959 | Wann | 324—64 |
| 2,922,103 | 1/1960 | Smith | 324—10 XR |
| 3,025,458 | 3/1962 | Eckfeldt et al. | 324—30 |
| 3,172,037 | 3/1965 | Pfeiffer | 324—30 |
| 2,773,236 | 12/1956 | Martin et al. | 324—30 X |
| 3,208,919 | 9/1965 | Sennett et al. | 324—30 X |

FOREIGN PATENTS 954,557  4/1964  Great Britain.

RUDOLPH V. ROLINEC, *Primary Examiner.*

C. F. ROBERTS, *Assistant Examiner.*

U.S. Cl. X.R.

324—10